United States Patent
Bart et al.

(10) Patent No.: US 8,182,202 B2
(45) Date of Patent: May 22, 2012

(54) COUPLING DEVICE FOR A TURBINE UPSTREAM GUIDE VANE, A TURBINE COMPRISING SAME, AND AIRCRAFT ENGINE FITTED THEREWITH

(75) Inventors: Jacques Rene Bart, Soisy sur Seine (FR); Didier Rene Andre Escure, Nandy (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1168 days.

(21) Appl. No.: 11/935,570

(22) Filed: Nov. 6, 2007

(65) Prior Publication Data

US 2008/0107530 A1    May 8, 2008

(30) Foreign Application Priority Data

Nov. 7, 2006 (FR) ..................................... 06 54747

(51) Int. Cl.
*F01D 11/00* (2006.01)
*F01D 9/04* (2006.01)
*F01D 5/18* (2006.01)

(52) U.S. Cl. ..... 415/115; 415/116; 415/189; 415/209.2; 415/209.3; 415/209.4; 415/174.4

(58) Field of Classification Search .......... 415/115–116, 415/189–190, 209.2, 209.3, 209.4, 210.1, 415/173.4, 174.4; 416/95, 96 R, 96 A, 97 R
See application file for complete search history.

(56) References Cited

U.S. PATENT DOCUMENTS

| | | | | |
|---|---|---|---|---|
| 3,860,359 A | * | 1/1975 | De Feo | 415/209.2 |
| 3,989,410 A | * | 11/1976 | Ferrari | 415/115 |
| 5,224,822 A | * | 7/1993 | Lenahan et al. | 415/189 |
| 5,271,714 A | * | 12/1993 | Shepherd et al. | 415/209.2 |
| 5,800,124 A | * | 9/1998 | Zelesky | 416/95 |
| 6,095,750 A | | 8/2000 | Ross et al. | |
| 6,530,744 B2 | * | 3/2003 | Liotta et al. | 415/115 |
| 6,742,987 B2 | * | 6/2004 | Correia et al. | 415/189 |
| 2002/0081199 A1 | * | 6/2002 | Pepi et al. | 416/96 R |

FOREIGN PATENT DOCUMENTS

| | | |
|---|---|---|
| EP | 0 513 956 A1 | 11/1992 |
| EP | 1 369 552 A2 | 12/2003 |

\* cited by examiner

*Primary Examiner* — Christopher Verdier
(74) *Attorney, Agent, or Firm* — Oblon, Spivak, McClelland, Maier & Neustadt, L.L.P.

(57) ABSTRACT

A coupling device for coupling a turbine upstream guide vane which is coupled to a supporting part which itself attached to a stabilizing part is disclosed. The coupling device includes a interlocking device for interlocking a supporting end of the supporting part with a stabilizing end of the stabilizing part, and a retaining part to keep the supporting end and the stabilizing end interlocked. The coupling device may be used to couple an upstream guide vane of a turbojet turbine.

21 Claims, 3 Drawing Sheets

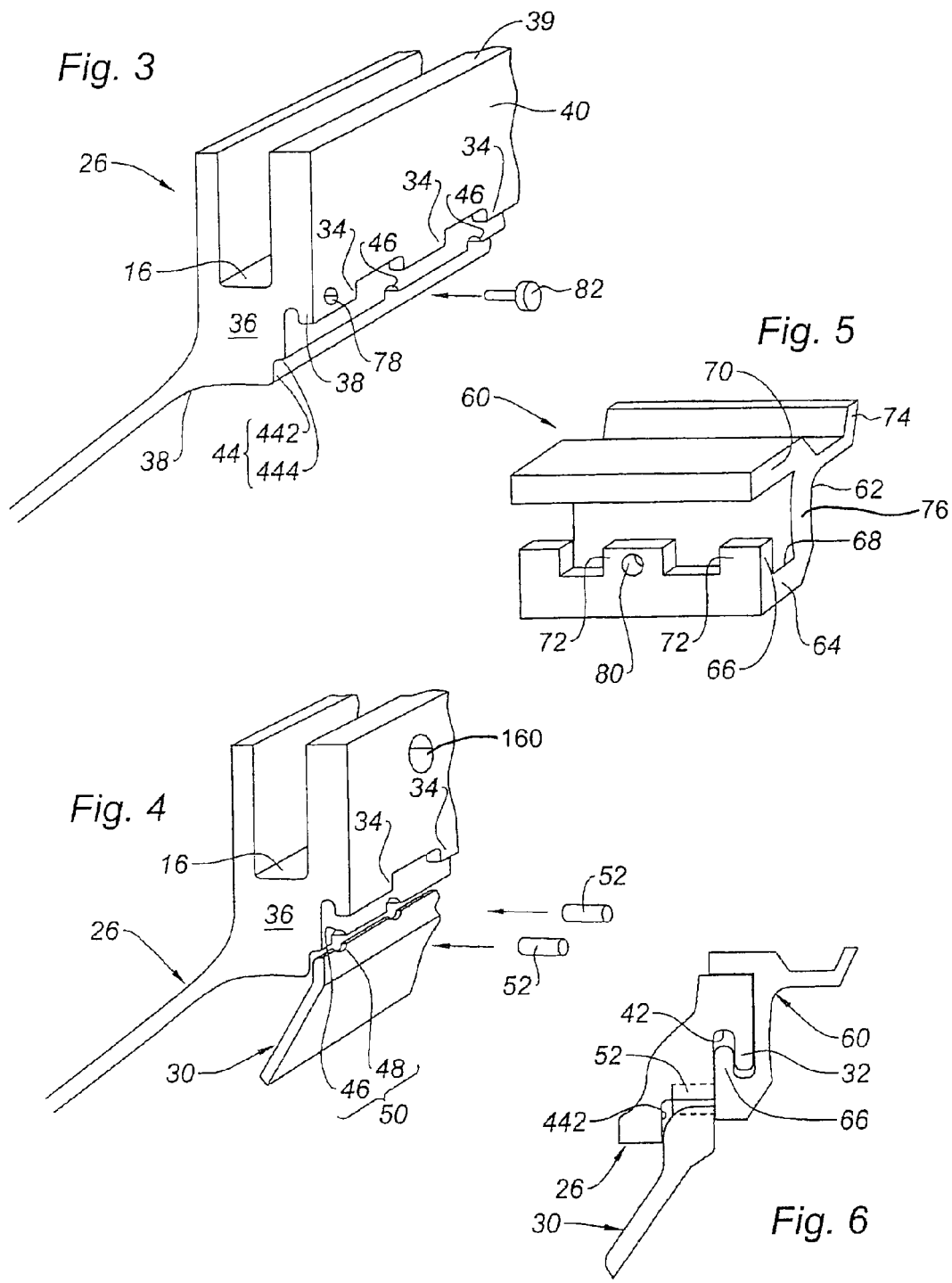

COUPLING DEVICE FOR A TURBINE UPSTREAM GUIDE VANE, A TURBINE COMPRISING SAME, AND AIRCRAFT ENGINE FITTED THEREWITH

BACKGROUND OF THE INVENTION

The present invention relates to turbojet turbines. More precisely, it involves the coupling of an upstream guide vane of a turbojet turbine.

The subject of the invention is a device for coupling an upstream guide vane of a turbine to fixed structures of this same turbine. A further subject is a turbine comprising such a coupling device. A final subject is a turbojet fitted with at least one such coupling device and/or such a turbine.

The turbine may be a high-pressure turbine.

A turbojet turbine comprises fixed elements (stator) and movable elements (rotor). The movable elements are wheels carrying airfoils, inserted between grilles of fixed airfoils, also called an upstream guide vane. The upstream guide vane/wheel assembly forms a turbine stage. To make it easier to install the turbine, the upstream guide vanes are sometimes obtained by assembling at least two upstream guide vane sectors. Each upstream guide vane sector comprises a certain number of fixed airfoils distributed between an outer ring called an outer platform and an inner ring called an inner platform. Usually, the inner platform is extended radially inward via a coupling flange used to attach the upstream guide vane or the upstream guide vane sector to a supporting part. To simplify the rest of the description, the term "upstream guide vane" will be employed to designate a complete upstream guide vane or an upstream guide vane sector.

DESCRIPTION OF THE PRIOR ART

An existing design of a coupling device is illustrated in FIG. 7, which represents a portion of a turbojet and shows a shaft 102, the combustion chamber 104, a high pressure turbine stage whose wheel consists of a disk 106 and movable airfoils 108 and whose upstream guide vane comprises fixed airfoils 110, a lower platform 112 and a coupling flange 114.

In existing designs, such as that illustrated in FIG. 7, the coupling of the upstream guide vane uses as a supporting part a casing 122 of the injectors 116. This supporting part is stabilized by attachment to a fixed structural part, that is an extension 124 of a support 118 made of abradable material. The coupling is achieved by the combined action of a locking of the coupling flange 114 relative to said casing and/or relative to said extension, and a bolted connection 126 between said extension 124 and said casing 122.

According to an existing design, the locking of the coupling flange 114 is achieved by locking means that comprise a first pin placed in a radial direction and pressing on a circumferential shoulder of said extension, this first pin being designed to lock the coupling flange against said casing in the axial direction. According to this same design, the locking means also comprise a second pin traversing both said casing and said coupling flange, this second pin being designed to lock the coupling flange in the radial and circumferential directions.

According to another existing design, each coupling device comprises a locking recess of said casing, said recess opening radially outward and being dimensioned to receive said coupling flange and lock the latter radially inward. According to this same other existing design, the coupling device also comprises a pin placed in an axial direction and designed to lock the coupling flange in the radial and circumferential directions, this pin traversing both said coupling flange and said casing, and butting axially against said extension.

According to one and the other of the two existing designs of a coupling device, the injector casing and the extension support made of abradable material are attached together by at least one bolted connection.

SUMMARY OF THE INVENTION

The object of the invention is to propose a simplified coupling, and in particular a coupling that does not use the bolted connection. The subject of the invention is a coupling device for an upstream guide vane of a turbine, said upstream guide vane being coupled to a supporting part itself attached to a stabilizing part.

According to a first aspect, the invention relates to a coupling device that comprises:
  interlocking means for interlocking a supporting end of the supporting part with a stabilizing end of the stabilizing part, and
  a retaining part to keep said supporting end and said stabilizing end interlocked.

The interlocking means comprise a crank of the supporting end, and matching shape and dimensioning of the stabilizing end.

The coupling device also comprises retaining means for preventing a relative rotation of the supporting end and the stabilizing end.

Said retaining means comprise at least one groove having a semicircular section hollowed out in a facet of the supporting end and at least one groove having a semicircular section hollowed out in a face of the stabilizing end, the two grooves being placed, in service, opposite one another, so as to define together an orifice when the two ends are interlocked.

Said retaining means also comprise at least one retaining pin designed to be inserted into said orifice when the two ends are interlocked.

The retaining part is an annular part that has a substantially J-shaped section. It comprises a central framework that extends to one end via a radiating portion itself extending via a terminal portion which extends parallel to the central framework, said central framework, radiating portion and terminal portion defining between them a retaining recess, and said central framework extends to another end via a collar which for its part is substantially perpendicular and which overhangs the radiating portion and the terminal portion.

The retaining part also comprises a gripping flange which extends in a substantially perpendicular direction from the central framework, on the side opposite to the retaining recess relative to said central framework.

The coupling device also comprises means for snap-fitting the supporting end and the retaining part.

Said snap-fitting means comprise teeth of the supporting end and matching teeth of the retaining part. The teeth of the supporting end are on a rim of said supporting end. The matching teeth of the retaining part are on the terminal portion of said retaining part.

The coupling device also comprises immobilizing means for preventing the retaining part from rotating relative to the supporting end. The immobilizing means comprise a domed profile of the retaining part. They also comprise a hole for immobilizing the supporting end and a hole for immobilizing the retaining part, the two immobilizing holes having substantially the same diameter, and an immobilizing pin designed to traverse these two immobilizing holes. The hole for immobilizing the retaining part is on one of the matching teeth of the retaining part and said hole for immobilizing the supporting end is on one of the teeth of the supporting end.

The coupling device also comprises means for locking the upstream guide vane relative to the supporting end, said upstream guide vane comprising fixed airfoils angularly distributed between two substantially annular and concentric platforms. Said locking means comprise:
- a flange for coupling the upstream guide vane, that extends beyond the platform with the smaller curvature radius, relative to the airfoils,
- holes traversing said coupling flange that are distributed in the circumferential direction of the latter,
- a recess for locking the supporting end, said locking recess opening radially outward,
- holes traversing the walls of said locking recess, and
- a locking pin designed to traverse both said holes of the coupling flange and said holes of the walls of the locking recess.

Preferably, said locking pin is a shouldered pin. Said locking pin is retained, in service, between the supporting end and the retaining part.

According to one embodiment of the invention, the supporting part consists of an injector casing, and the stabilizing part consists of an extension of a support made of abradable material.

According to a second aspect, the invention relates to a turbine comprising at least one upstream guide vane coupling device according to the first aspect.

According to a third aspect, the invention relates to an aircraft engine comprising a turbine according to the second aspect and/or at least one coupling device according to the first aspect.

One advantage of the invention lies in the fact that the total weight of the aircraft engine is reduced, since the coupling of the upstream guide vane no longer uses bolted connections. The result of this is a reduction in the operating costs of the aircraft engine, achieved by fuel savings during the flight phases of the aircraft.

Another advantage of the invention lies in the fact that the installation times are reduced since there is no bolted connection. The result of this is a reduction in maintenance costs.

BRIEF DESCRIPTION OF THE DRAWINGS

The invention will be better understood on reading the following detailed description of a particular embodiment of the invention, supplied as an indication and in no way limiting, and illustrated by means of the appended drawings, in which:

FIG. 3 represents, in a perspective view, the supporting end and interlocking means and snap-fitting means;

FIG. 4 illustrates, in a perspective view, the interlocking of the supporting end with the stabilizing end, and the retaining means;

FIG. 5 represents, in a perspective view, the retaining part, and snap-fitting means and immobilizing means; and FIG. 6 illustrates, in radial section, the interlocking of the supporting end with the stabilizing end, and their retention by means of the retaining part.

DESCRIPTION OF THE PREFERRED EMBODIMENTS

Figure 1:
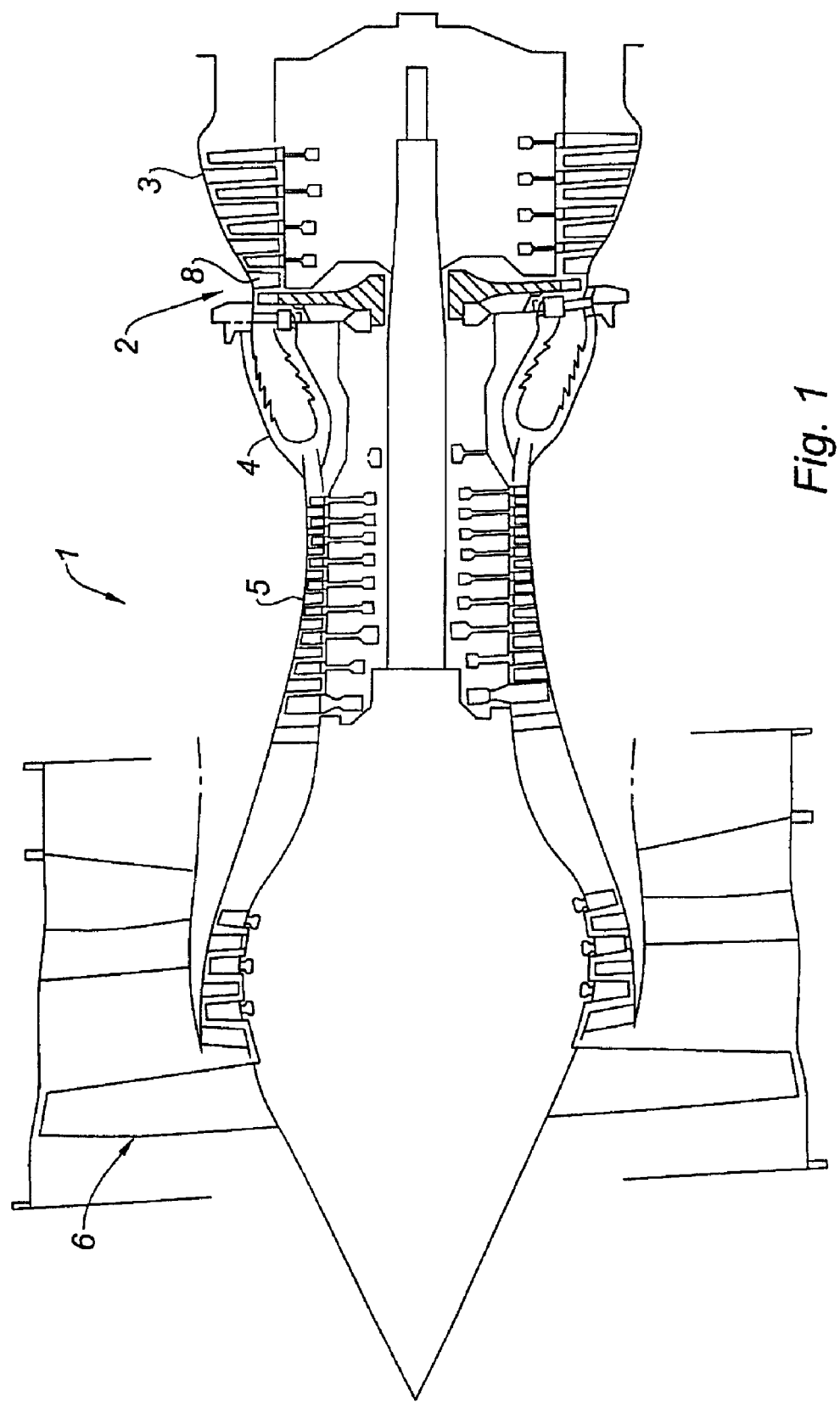
FIG. 1 represents, in axial section and in a schematic manner, a turbojet fitted with a turbine provided with a coupling device according to the invention.

With reference first of all to FIG. 1, it represents schematically a turbojet 1, comprising a high-pressure turbine 2, a low-pressure turbine 3, a combustion chamber 4, a high-pressure compressor 5, a fan 6. The high-pressure turbine 2 is provided with upstream guide vanes 8.

Figure 2:
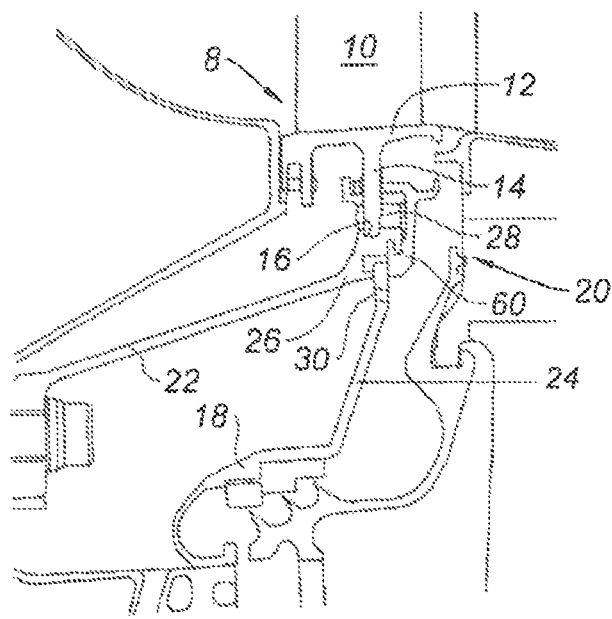
FIG. 2 represents, in axial section, a coupling device according to the invention.
Figure 7:
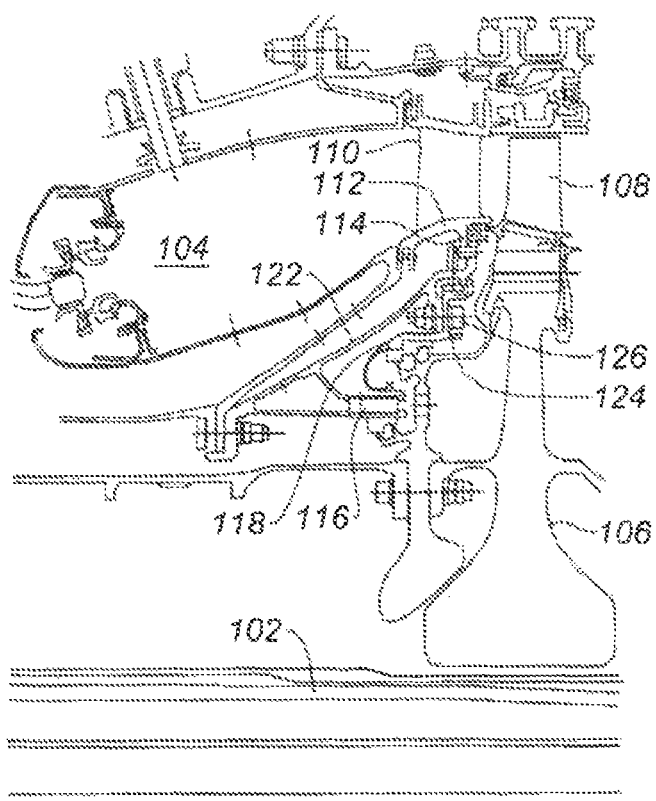
FIG. 7 already described, represents, in axial section, a portion of a turbojet illustrating a coupling device of the prior art.

Now with reference to FIG. 2, it represents a coupling device 20 of a turbine upstream guide vane 8, the upstream guide vane 8 comprising fixed airfoils 10 distributed between an outer platform (not shown) and an inner platform 12. A coupling flange 14 extends from this inner platform 12, being opposite to the fixed airfoils 10 relative to said inner platform 12.

In a manner similar to the previously described existing designs of a coupling device, the upstream guide vane 8 is coupled to a supporting part, and this supporting part is itself attached to a stabilizing part. In the example illustrated in the figures, the supporting part is a casing 22 of the injectors (not shown), and the stabilizing part is an extension 30 of a support 18 made of abradable material.

The coupling device 20 according to the invention uses a retaining part 60 that contributes to the attachment of the stabilizing part 30 and of the supporting part 22, and that contributes to the coupling of the upstream guide vane 8 to the supporting part 22.

In a manner similar to one of the previously described existing designs of the coupling device, the locking of the upstream guide vane 8 relative to the supporting parts 22 is achieved by means of the coupling flange 14, that is locked in a locking recess 16 of the end 26 of the injector casing 22, by means of a locking pin 28. Accordingly, the dimensions of the locking recess 16 are adapted to the dimensions of the coupling flange 14, the coupling flange 14 is pierced with a coupling flange hole (not visible in the figures), and the walls of the locking recess 16 are respectively pierced with wall holes 160 (see FIG. 4). The locking pin 28 traverses said coupling flange hole and said wall holes. The locking pin 28 is a shouldered pin, so that it butts against one of the walls of the locking recess 16, that is the wall furthest downstream in FIG. 2.

The coupling flange 14, the locking recess 16, the locking pin 28 and the respective holes form the means for locking the coupling device 20 according to the invention.

In addition to the locking means 14, 16, 28, the coupling device according to the invention comprises means 44 for interlocking one end 26 of the injector casing 22 with one end 30 of the extension 24 of the support 18 made of abradable material, retaining means 46, 48, 50, 52 for preventing a relative rotation of the casing 22 relative to the extension 24, a retaining part 60 for keeping the casing 22 and the extension 24 together, means 34, 72 for snap-fitting the retaining part 60 to the casing 22, and immobilizing means 76, 78, 80, 82 for preventing a rotation of the retaining part 60 relative to the casing 22. All these means will be described below.

To clarify the rest of the description, the end 26 of the casing 22 will be called the "supporting end 26", and the end 30 of the extension 24 will be called the "stabilizing end 30".

As illustrated in FIG. 3, the supporting end 26 is a part of revolution about an axial direction that comprises an end body 36 from which the two walls delimiting the locking recess 16 described above extend radially outward. The end body 36 has a substantially rectangular axial section. The end body 36 has an inner face 38 situated opposite to the locking recess 16, an outer face 39 and a rear face 40 extending radially.

The furthest rearward wall of the recess 16 comprises a rim 32 which extends it rearward relative to the rear face 40 of the body 36. This rim 32 extends radially parallel to the direction opposite to the direction of opening of the recess 16. A rear recess 42 is formed between the rim 32 and the rear face 40. On the free end of this rim 32, teeth 34 are cut out that follow one another over the whole periphery of the rim 32. These teeth 34 are directed radially inward.

At the junction of the inner face 38 and the rear face 40, the end body 36 has a crank 44 having a first facet 442 substantially parallel to the rear face 40 and a second facet 444 substantially perpendicular to said first facet 442. Grooves 46 are arranged in said second facet 444, said grooves being oriented in the axial direction and having a substantially semicircular profile.

FIG. 4 illustrates the interlocking between the supporting end 26 and the stabilizing end 30. Accordingly, the tip of the stabilizing end 30 has a shape and dimensions that match those of the crank 44 of the supporting end 26. In particular, the stabilizing end 30 comprises a first face and a second face designed to come into contact respectively with said first facet 442 and second facet 444 of the supporting end 26. Grooves 48 are arranged in said second face, said grooves 48 being oriented in the axial direction and having a substantially semicircular profile.

In service, the supporting end 26 and the stabilizing end 30 are interlocked with one another by an interlocking of the mortise and tenon type. This interlocking is achieved by butting the respective first facet 442 and second facet 444 of the supporting end 26 with the respective first face and second face of the stabilizing end 30. The interlocking is achieved so that the grooves 46 of the second facet 444 of the supporting end 26 come opposite the grooves 48 of the second face of the stabilizing end 30, in order to form together retaining orifices 50. Retaining pins 52 are inserted into said retaining orifices in order to prevent said supporting end 26 and said stabilizing end 30 from rotating axially relative to one another.

The interlocking means of the coupling device 20 comprise said crank 44 of the supporting end 26, and the matching shapes and dimensions of the stabilizing end 30.

The means for retaining the coupling device 20 comprise said grooves 46 of the supporting end 26, said grooves 48 of the stabilizing end 30 and said retaining orifices 50, and said retaining pins 52.

The interlocking between the supporting end 26 and the stabilizing end 30 is retained by means of a retaining part 60 that is illustrated in FIG. 5.

The retaining part 60 is a part that is annular of revolution about an axial direction. It comprises a rectilinear central framework 62. The latter extends to one end via a radiating portion 64 itself extending via a terminal portion 66 which returns to the central framework 62 and extends parallel to the latter. The central framework 62, the radiating portion 64 and the terminal portion 66 define between them a retaining recess 68, and said central framework 62 extends to another end via a rectilinear collar 70 which for its part is substantially perpendicular and which overhangs said radiating portion 64 and said terminal portion 66. In axial section, the retaining part 60 has a substantially J-shaped section whose vertical bar corresponds to the central framework 62 and whose horizontal bar corresponds to the collar 70.

The central framework 62 forms an elastically deformable zone of the retaining part 60, which allows the latter to be installed by an operator, as will be described below.

On the free end of the terminal portion 66, teeth 72 are cut which succeed one another over the whole periphery of this terminal portion 66. The shape and dimensions of the teeth 72 match the shape and dimensions of the teeth 34 of the rim 32 of the supporting end 26.

The retaining part 60 also comprises a gripping flange 74 which extends from the central framework 62, on the side opposite to the retaining recess 68 relative to said central framework 62, and being slightly offset relative to the collar 70. This gripping flange 74 comprises two successive zones that are angularly offset relative to one another and that make it easier for an operator to grasp this gripping flange 74 and deform the central framework 62.

FIG. 6 illustrates, in radial section, the retention of the interlocking of the two ends 26, 30 by means of the retaining part 60. The retaining part 60 has been snap-fitted onto the supporting end 26, that is shown only partially.

The snap-fitting operation is carried out in the following manner. The operator holds the retaining part 60 by its gripping flange 74. He inserts the free end of the terminal portion 66 of the retaining part 60 into the rear recess 42 of the body 36 of the end 26, by placing the matching teeth 72 of the retaining part 60 between the teeth 34 of the rim 32. Simultaneously, the rim 32 of the supporting end 26 is inserted into the retaining recess 68 of the retaining part 60. This insertion is made easier by the presence of the elastic zone of the retaining part 60. The operator then releases the gripping flange 74. The central framework 62 of the retaining part 60 is then pressed against the rim 32 of the supporting end 26, and the collar 70 of the retaining part 60 is pressed against the outer face 39 of the supporting end 26. The operator then rotates the retaining part 60 relative to the supporting end 26 with an axial rotation. The teeth 34 of the rim 32 and the matching teeth 72 of the retaining part 60 overlap and prevent the supporting end 26 and the retaining part 60 from separating from one another. The snap-fitting thus obtained is of the bayonet locking type.

The result of the snap-fitting that has just been described is that the stabilizing end 30 is pressed axially against the first facet 442 of the supporting end 26 by the terminal portion 66 of the retaining part 60.

The snap-fitting means of the coupling device 20 comprise the teeth 34 of the rim 32 of the supporting end 26 and the matching teeth 72 of the retaining part 60.

The coupling device 20 comprises further immobilizing means designed to prevent an inverse rotation of the retaining part 60 relative to the supporting end 26 that would lead to an undesired disengagement of the latter.

These immobilizing means comprise a slightly domed profile 76 of the central framework 62, the convexity of this slightly domed profile 76 being situated on the side of the retaining recess 68 (see FIG. 5). This slightly domed profile 76 causes an axial tension in the retaining part 60, which creates a friction between said retaining part 60 and the rear face 40 of the supporting end 26, and prevents a relative rotation of these two parts (see FIG. 6).

Supplementary immobilizing means are illustrated in FIGS. 3 and 5. They comprise a hole 78 for immobilizing the supporting end 26, pierced in one of the teeth 34 of the rim 32. They also comprise a hole 80 for immobilizing the retaining part 60, pierced in one of the matching teeth 72. Finally they comprise an immobilizing pin 82 designed to be inserted into these two immobilizing holes 78, 80 that accordingly have substantially the same diameter. Preferably, the immobilizing pin 82 is a shouldered pin (see FIG. 3). During the snap-fitting operation, the operator is sure to place the two teeth pierced with these two immobilizing holes 78, 80 in line with one another and immobilizes the two snap-fitted parts by inserting the immobilizing pin 82 into the two immobilizing holes 78, 80 thus placed in line.

The invention is not limited to the particular embodiment that has just been described. It also applies to equivalent embodiments within the scope of those skilled in the art.

The invention claimed is:

1. A coupling device for an upstream guide vane of a turbine, said upstream guide vane being coupled to a supporting part attached to a stabilizing part,
    and comprising:
    interlocking means for interlocking a supporting end of the supporting part with a stabilizing end of the stabilizing part, and
    a retaining part to keep said supporting end and said stabilizing end interlocked, retaining means for preventing a relative rotation of the supporting end and the stabilizing end,
    wherein said retaining means comprise at least one groove having a semicircular section hollowed out in a facet of the supporting end and at least one groove having a semicircular section hollowed out in a face of the stabilizing end, the two grooves being placed, in service, opposite one another, so as to define together a retaining orifice when the two ends are interlocked.

2. The coupling device as claimed in claim 1, wherein said retaining means further comprise at least one retaining pin designed to be inserted into said retaining orifice when the two ends are interlocked.

3. The coupling device as claimed in claim 1, wherein said retaining part is an annular part that has a substantially J-shaped section.

4. The coupling device as claimed in claim 3, wherein said retaining part comprises a central framework that extends to one end via a radiating portion itself extending via a terminal portion which extends parallel to the central framework, said central framework, radiating portion and terminal portion defining between them a retaining recess, and said central framework extends to another end via a collar which is substantially perpendicular to said central framework and which overhangs the radiating portion and the terminal portion.

5. The coupling device as claimed in claim 4, wherein said retaining part further comprises a gripping flange which extends in a substantially perpendicular direction from the central framework, on the side opposite to the retaining recess relative to said central framework.

6. The coupling device as claimed in claim 1, further comprising means for snap-fitting the supporting end and the retaining part.

7. The coupling device as claimed in claim 6, wherein said snap-fitting means comprise teeth of the supporting end and matching teeth of the retaining part.

8. The coupling device as claimed in claim 7, wherein said teeth of the supporting end are on a rim of said supporting end.

9. The coupling device as claimed in claim 5, wherein matching teeth of the retaining part are on the terminal portion of said retaining part.

10. The coupling device as claimed in claim 1, further comprising immobilizing means for preventing the retaining part from rotating relative to the supporting end.

11. The coupling device as claimed in claim 10, wherein said immobilizing means comprise a domed profile of the retaining part.

12. The coupling device as claimed in claim 11, wherein said immobilizing means further comprise a hole for immobilizing the supporting end and a hole for immobilizing the retaining part, the two immobilizing holes having substantially the same diameter, and an immobilizing pin designed to traverse these two immobilizing holes.

13. The coupling device as claimed in claim 12, wherein said hole for immobilizing the retaining part is on one of matching teeth of the retaining part and wherein said hole for immobilizing the supporting end is on one of teeth of the supporting end.

14. The coupling device as claimed in claim 1, further comprising means for locking the upstream guide vane relative to the supporting end, said upstream guide vane comprising fixed airfoils angularly distributed between two substantially annular and concentric platforms.

15. The coupling device as claimed in claim 14, wherein said means for locking the upstream guide vane relative to the supporting end comprise:
    a flange for coupling the upstream guide vane, that extends beyond the platforms of the two substantially annular and concentric platforms with a smaller curvature radius, relative to the airfoils,
    holes traversing said coupling flange that are distributed in the circumferential direction of the latter,
    a recess for locking the supporting end, said locking recess opening radially outward,
    holes traversing the walls of said locking recess, and
    a locking pin designed to traverse both said holes of the coupling flange and said holes of the walls of the locking recess.

16. The coupling device as claimed in claim 15, wherein said locking pin is a shouldered pin.

17. The coupling device as claimed in claim 15, wherein said locking pin is retained, in service, between the supporting end and the retaining part.

18. The coupling device as claimed in claim 1, wherein said supporting part consists of an injector casing.

19. The coupling device as claimed in claim 1, wherein said stabilizing part consists of an extension of a support made of abradable material.

20. A turbine, comprising at least one upstream guide vane coupling device as claimed in claim 1.

21. An aircraft engine, which comprises a turbine with at least one coupling device as claimed in claim 1.

* * * * *